(12) United States Patent
Nakagome et al.

(10) Patent No.: US 11,831,216 B2
(45) Date of Patent: Nov. 28, 2023

(54) LINEAR MOTOR SYSTEM

(71) Applicant: Mitsubishi Electric Corporation, Tokyo (JP)

(72) Inventors: Fumihiko Nakagome, Tokyo (JP); Masaoki Iwase, Tokyo (JP); Kazuhiko Fukushima, Tokyo (JP); Hiroshi Wakayama, Tokyo (JP); Takahiko Murakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 194 days.

(21) Appl. No.: 17/620,748

(22) PCT Filed: Aug. 27, 2019

(86) PCT No.: PCT/JP2019/033563
§ 371 (c)(1),
(2) Date: Dec. 20, 2021

(87) PCT Pub. No.: WO2021/038728
PCT Pub. Date: Mar. 4, 2021

(65) Prior Publication Data
US 2022/0416637 A1 Dec. 29, 2022

(51) Int. Cl.
*H02K 41/03* (2006.01)
*B65G 54/02* (2006.01)
*H02K 41/02* (2006.01)

(52) U.S. Cl.
CPC .......... *H02K 41/031* (2013.01); *B65G 54/02* (2013.01); *H02K 41/03* (2013.01); *H02K 41/02* (2013.01)

(58) Field of Classification Search
CPC ...... B65G 54/02; H02K 41/031; H02K 41/03; H02K 41/02

(Continued)

(56) References Cited

U.S. PATENT DOCUMENTS 4,558,910 A * 12/1985 Teramachi .......... F16C 29/0626
384/44
4,613,962 A 9/1986 Inoue et al.
(Continued)

FOREIGN PATENT DOCUMENTS

JP 55-98188 U 7/1980
JP 59-69318 A 4/1984
(Continued)

OTHER PUBLICATIONS

International Search Report and Written Opinion dated Nov. 5, 2019, received for PCT Application PCT/JP2019/033563, Filed on Aug. 27, 2019, 8 pages including English Translation.

*Primary Examiner* — James R Bidwell
(74) *Attorney, Agent, or Firm* — XSENSUS LLP

(57) ABSTRACT

A linear motor system includes: a mover including permanent magnets arranged in a traveling direction in a plane parallel to a plane formed by the traveling direction and a vertical direction; and a stator including an armature including an iron core in which projections around which windings are wound are arranged in the traveling direction, the armature being disposed to face the permanent magnets of the mover. The mover includes a mover body including a first main roller engaged with a first traveling surface disposed on the stator, a placing table on which a conveyance object is placed, and a sub-roller engaged with a second traveling surface disposed on an upper surface of the stator. The first main roller supports a magnetic attraction force generated between the stator and the mover, and the sub-roller supports a force in a direction opposite the magnetic attraction force acting on the mover.

8 Claims, 9 Drawing Sheets

(58) Field of Classification Search
USPC .......................................................... 198/805
See application file for complete search history.

(56) References Cited

U.S. PATENT DOCUMENTS

| | | | | |
|---|---|---|---|---|
| 4,659,238 | A | * | 4/1987 | Teramachi .............. F16C 33/36 384/44 |
| 4,908,533 | A | | 3/1990 | Karita et al. |
| 5,090,821 | A | | 2/1992 | Tsukada |
| 11,745,961 | B2 | * | 9/2023 | Cameron ............... H02K 41/03 198/805 |
| 2015/0027860 | A1 | * | 1/2015 | Kleinikkink ........... B65G 54/02 198/867.01 |
| 2019/0103800 | A1 | | 4/2019 | Ozimek et al. |
| 2020/0102160 | A1 | * | 4/2020 | Haya .................... H02K 41/031 |

FOREIGN PATENT DOCUMENTS

| | | | | |
|---|---|---|---|---|
| JP | 60-134915 | A | | 7/1985 |
| JP | 3-110216 | U | | 11/1991 |
| WO | 2017/211692 | A1 | | 12/2017 |
| WO | 2019/238277 | | * | 12/2019 ............. B65G 54/02 |
| WO | 2021/063742 | | * | 4/2021 ............. B65G 54/02 |

* cited by examiner

LINEAR MOTOR SYSTEM

CROSS-REFERENCE TO RELATED APPLICATION

The present application is based on PCT filing PCT/JP2019/033563, filed Aug. 27, 2019, the entire contents of which are incorporated herein by reference.

FIELD

The present invention relates to a linear motor system using a linear synchronous motor.

BACKGROUND

In order to convey conveyance objects such as a workpiece, a jig, or the like between the inside and the outside of an apparatus, a belt conveyor driven by a rotary motor is generally used. However, for the purpose of improving production efficiency, a conveyance device that conveys conveyance objects independently using a linear synchronous motor is known. A conveyance device described in Patent Literature 1 includes a conveying path including a rail having two first projecting portions that project upward from both ends of a central portion in the width direction in a cross section perpendicular to a traveling direction, and a plurality of stators arranged at predetermined intervals in the traveling direction between the two first projecting portions. In addition, the conveyance device includes a moving body having two second projecting portions that project downward from both ends of a central portion in the width direction in a cross section perpendicular to the traveling direction. The moving body includes rollers provided at positions corresponding to the upper surfaces of the first projecting portions of the rail, side rollers provided at positions corresponding to the outer side surfaces of the first projecting portions, cam followers provided at lower portions of the second projecting portions, and a reaction plate disposed at a position vertically facing the stator. The cam followers are provided so as to be in contact with the exposed lower surfaces of the first projecting portions. In the conveyance device having such a configuration, even if the moving body moves on the conveying path having a curved portion, the moving body is prevented from being detached from the conveying path by an external force such as a centrifugal force generated in the curved portion.

CITATION LIST

Patent Literature

Patent Literature 1: Japanese Application Laid-Open No. S60-134915

SUMMARY

Technical Problem

However, according to the above-described conventional technique, when the moving body moves, the two rows of rollers and the two rows of side rollers receive the sliding frictional resistance force generated between the rollers and the conveying path. Thus, a technique for reducing the sliding frictional resistance force generated between the rollers and the conveying path has been demanded.

The present invention has been made in view of the above, and an object thereof is to obtain a linear motor system capable of reducing the sliding frictional resistance force generated between a moving body and a conveying path.

Solution to Problem

In order to overcome the above-described disadvantage and achieve the object, a linear motor system of the present invention includes: a mover including a plurality of permanent magnets arranged in a traveling direction in a plane parallel to a plane formed by the traveling direction and a vertical direction; and a stator including an armature including an iron core in which a plurality of projections around which windings are wound are arranged in the traveling direction, the armature being disposed to face the permanent magnets of the mover. The mover includes: a mover body including a first main roller engaged with a first traveling surface disposed on the stator; a placing table on which a conveyance object is placed; and a sub-roller engaged with a second traveling surface disposed on an upper surface of the stator. The first main roller supports a magnetic attraction force generated between the stator and the mover, and the sub-roller supports a force in a direction opposite to the magnetic attraction force acting on the mover.

Advantageous Effects of Invention

The linear motor system according to the present invention has an effect of being capable of reducing the sliding frictional resistance force generated between the moving body and the conveying path.

DESCRIPTION OF EMBODIMENTS

Hereinafter, linear motor systems according to embodiments of the present invention will be described in detail with reference to the drawings. Note that the present invention is not limited by these embodiments.

First Embodiment

Figure 1:
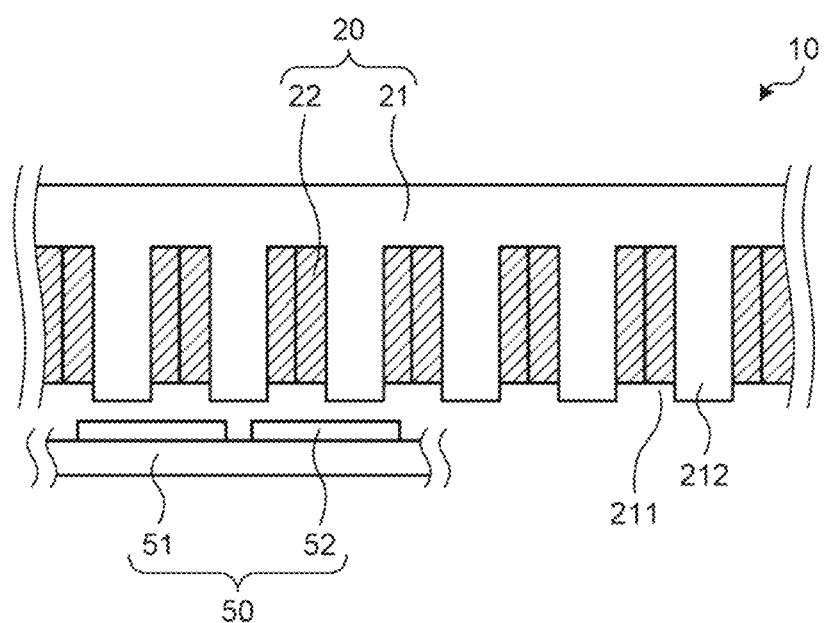
FIG. 1 is a cross-sectional view schematically illustrating an example of a linear motor used in a linear motor system according to a first embodiment.

FIG. 1 is a cross-sectional view schematically illustrating an example of a linear motor used in a linear motor system according to a first embodiment. A linear motor 10 includes an armature 20 and a mover 50. The armature 20 includes an iron core 21 including a plurality of grooves 211 arranged at predetermined intervals in a traveling direction of the mover 50, and windings 22 wound around projections 212 between ones of the grooves 211 that are adjacent in the traveling direction.

The mover 50 includes a flat plate-shaped base plate 51 made of a magnetic material, and two or more permanent magnets 52 linearly arranged on the base plate 51 at predetermined intervals in the traveling direction of the mover 50. The linear motor 10 has a moving magnet structure in which the permanent magnets 52 of the mover 50 are disposed to face the projections 212 of the armature 20, and the mover 50 is moved in the traveling direction by the thrust generated between the armature 20 and the mover 50.

Figure 2:
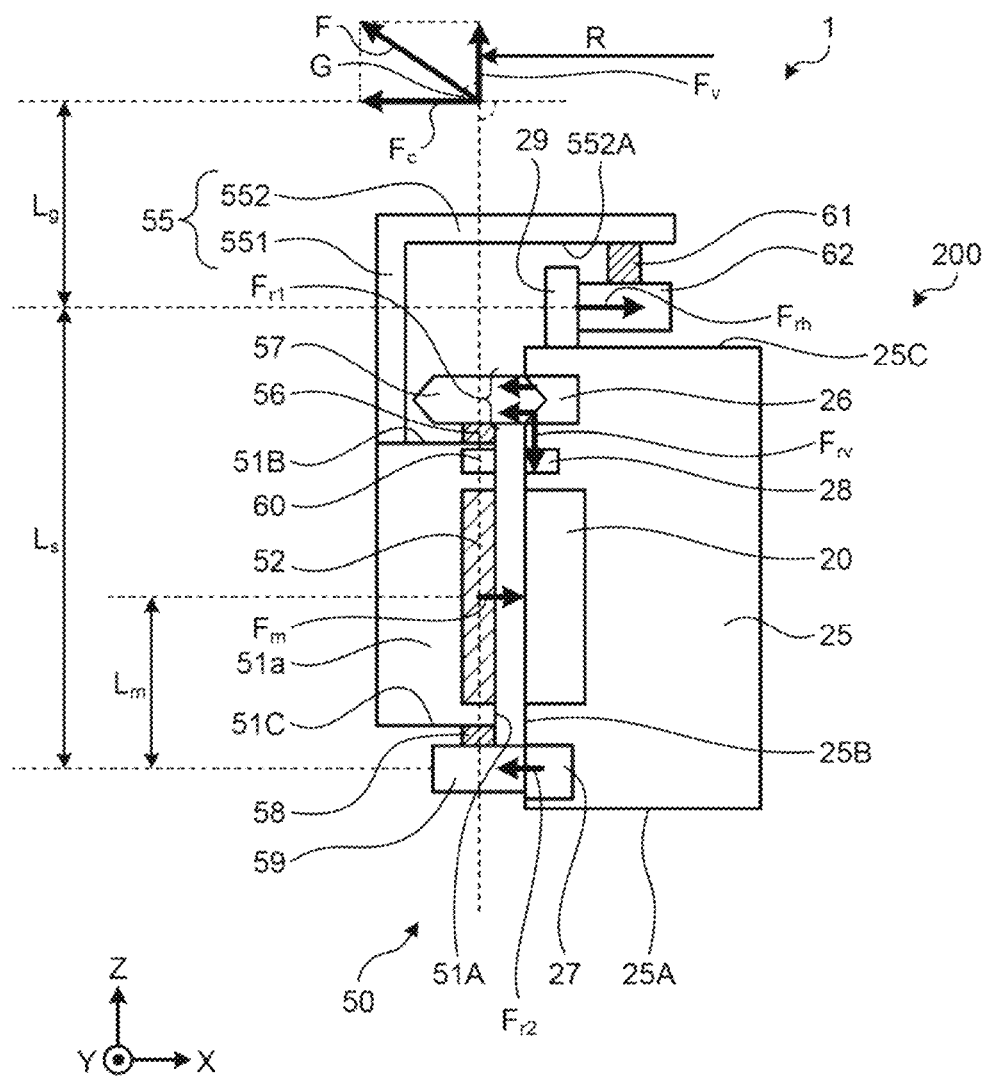
FIG. 2 is a cross-sectional view schematically illustrating an example of a configuration of the linear motor system according to the first embodiment.

FIG. 2 is a cross-sectional view schematically illustrating an example of a configuration of the linear motor system according to the first embodiment. FIG. 2 illustrates a cross section perpendicular to the traveling direction of the mover 50. In FIG. 2, a direction perpendicular to the paper surface is defined as a Y direction, and two directions perpendicular to each other in the paper surface are defined as an X direction and a Z direction. In the following description, the Z direction corresponds to the vertical direction, and the XY plane corresponds to the horizontal plane. The Y direction is the traveling direction. In the following description, the positive Z direction is defined as upward, and the negative Z direction is defined as downward.

A linear motor system 1 includes a stator 200 and the mover 50. The stator 200 is provided on a path along which the mover 50 can move and serves as a conveying path. The stator 200 includes a base 25. That is, the base 25 is disposed along the path. The cross-sectional shape perpendicular to the direction of extension of the path is the shape illustrated in FIG. 2. A lower surface 25A of the base 25 is fixed to the installation surface.

Figure 3:
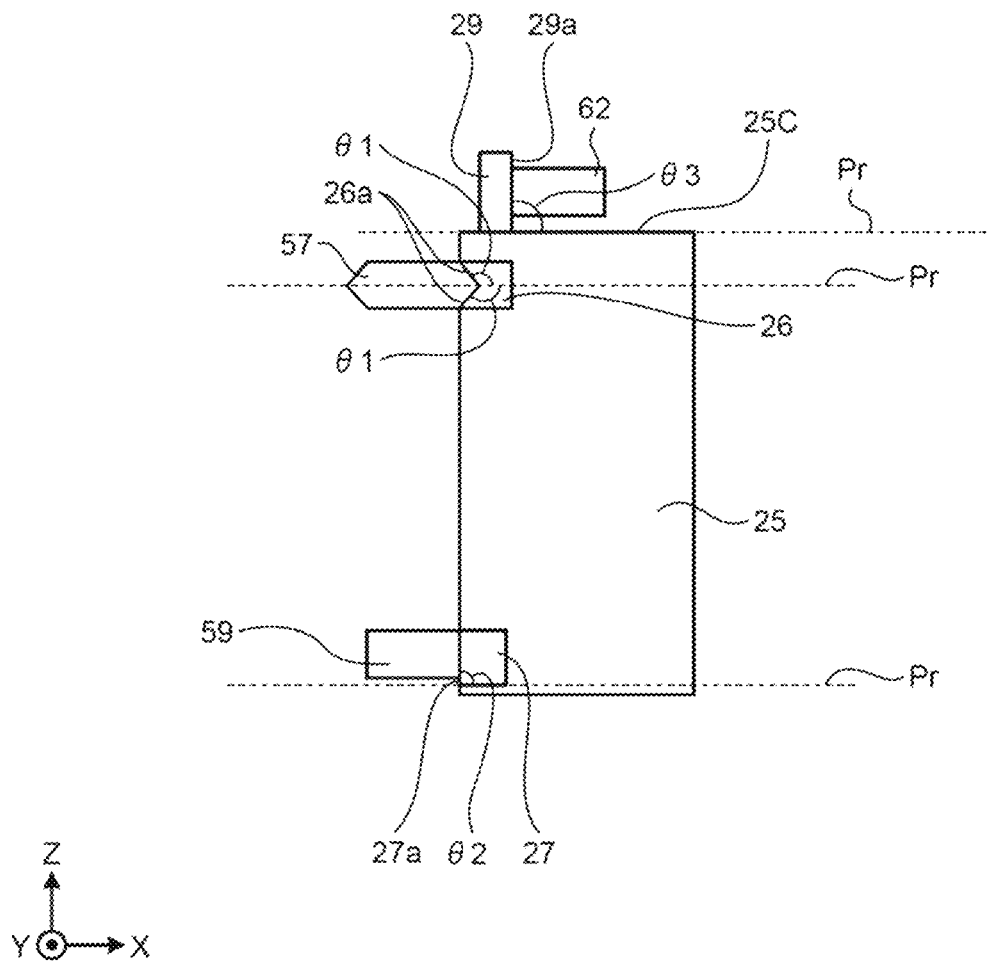
FIG. 3 is a diagram schematically illustrating an example of a state of a traveling surface of each rail according to the first embodiment.

FIG. 3 is a diagram schematically illustrating an example of a state of a traveling surface of each rail according to the first embodiment. The base 25 includes the plurality of armatures 20 described referring to FIG. 1. The armatures 20 are embedded in a side surface 25B facing the mover 50 among side surfaces, which are perpendicular to the X direction, of the base 25. In the side surface 25B, a rail 26 is provided above the armatures 20. The rail 26 has a first traveling surface 26a. In the side surface 25B, a rail 27 is provided below the armatures 20. The rail 27 has a third traveling surface 27a. The base 25 includes a position detection unit 28 between the armatures 20 and the rail 26 in the side surface 25B. The position detection unit 28 detects the position of the mover 50. In FIG. 3, a plane parallel to the XY plane is defined as a reference plane Pr. An angle θ1 of the first traveling surface 26a from the reference plane Pr is different from an angle θ2 of the third traveling surface 27a from the reference plane Pr. That is, the first traveling surface 26a and the third traveling surface 27a are not parallel to each other. In one example, the rail 26 is a V-groove rail having a V-shaped traveling surface, and the rail 27 is a guide rail that is a flat rail having a flat traveling surface. The base 25 includes a sub-rail 29 that has a second traveling surface 29a, on an upper surface 25C. As illustrated in FIG. 3, an angle θ3 of the second traveling surface 29a from the reference plane Pr is different from the angle θ1 of the first traveling surface 26a from the reference plane Pr. That is, the first traveling surface 26a and the second traveling surface 29a are not parallel to each other. The sub-rail 29 is a flat rail having a flat traveling surface. Note that the rails 26 and 27 and the sub-rail 29 extend in the same direction and do not intersect.

The mover 50 includes a mover body 5la, a placing table 55 on which a conveyance object such as a workpiece or a jig is placed, and a fastening member (not illustrated) that fastens the placing table 55 to the mover body 51a. The mover body 51a has a rectangular parallelepiped shape. In one example, the mover body 51a has the function of the base plate 51 and is made of a magnetic material. The mover body 51a includes the permanent magnets 52. The permanent magnets 52 are embedded in a side surface 51A facing the base 25 among side surfaces, which are perpendicular to the X direction, of the mover body 51a.

The mover body 51a includes a main roller 57 on an upper surface 51B with a rotation shaft. 56 therebetween, and includes a main roller 59 on a lower surface 51C with a rotation shaft 58 therebetween. The main roller 57 is provided at a position corresponding to the rail 26 provided at the base 25. In the cross section passing through the rotation shaft 56 of the main roller 57, the shape of the rolling surface present on the peripheral portion along the circumference is a triangular shape fitted to the rail 26. The main roller 59 is provided at a position corresponding to the rail 27 provided at the base 25. The main roller 59 is a flat roller. That is, in the cross section passing through the rotation shaft 58 of the main roller 59, the shape of the rolling surface present on the peripheral portion along the circumference is flat. The mover body 5la includes a position detection unit 60 between the permanent magnets 52 and the upper surface 51B.

The placing table 55 is disposed on the upper surface 51B of the mover body 51a. The placing table 55 has an L shape on the XZ plane. The placing table 55 includes a support portion 551 extending upward from the upper surface 51B of the mover body 51a, and a plate-shaped table portion 552. The plate-shaped table portion 552 is supported by the support portion 551 at one end and is parallel to the XY plane. A conveyance object is placed on the table portion 552.

The placing table 55 includes a sub-roller 62 on a lower surface 552A of the table portion 552 with a rotation shaft 61 therebetween. The sub-roller 62 is provided so as to be in contact with the sub-rail 29 disposed on the upper surface 25C of the base 25. The sub-roller 62 is a flat roller. That is, in the cross section passing through the rotation shaft 61 of the sub-roller 62, the shape of the rolling surface present on the peripheral portion along the circumference is flat. By using, as the sub-roller 62, a flat roller similarly to the main roller 59, the components can be made common.

The placing table 55 is detachable from the mover body 51a. In one example, the mover body 51a in a state where the main roller 57 is engaged with the rail 26 and the main roller 59 is engaged with the rail 27, and the placing table 55 in a state where the sub-roller 62 is engaged with the sub-rail 29 are fixed together by a fastening member such as a bolt. As a result, the mover 50 is movable in the traveling direction with respect to the stator 200, and is not easily detached from the stator 200.

In the first embodiment, the mover 50 moves on the stator 200 by rotation of three rows of rollers, that is, the main rollers 57 and 59 and the sub-roller 62. As a result, it is possible to reduce the sliding frictional resistance force generated between the mover 50 and the stator 200 during the movement of the mover 50 compared with the conventional structure in which four or more rows of rollers are provided.

In FIG. 2, while the linear motor system 1 is in operation, the magnetic attraction force $F_m$ acts between the armatures 20 and the permanent magnets 52. That is, the permanent magnets 52 receive the magnetic attraction force $F_m$ directed toward the armatures 20. The mover 50 including the permanent magnets 52 and the position detection unit 60 includes the main rollers 57 and 59 on both ends of the mover body 51a in the Z direction. The main roller 57 is engaged with the rail 26 attached to the stator 200 including the armatures 20 and the position detection unit 28. As a result, in the main roller 57, a support reaction force $F_{t1}$ from the rail 26 is generated in the direction from the stator 200 toward the mover 50. The main roller 59 is engaged with the rail 27 attached to the stator 200. As a result, in the main roller 59, a support reaction force $F_{t2}$ from the rail 27 is generated in the direction from the stator 200 toward the mover 50. Further, the main roller 57 holds the mover 50 with $F_{rv}$ in the Z direction perpendicular to the traveling direction. That is, the load $F_{rv}$ of the mover 50 is generated in the main roller 57. Thus, the mover 50 can support the load of the conveyance object.

Figure 4:
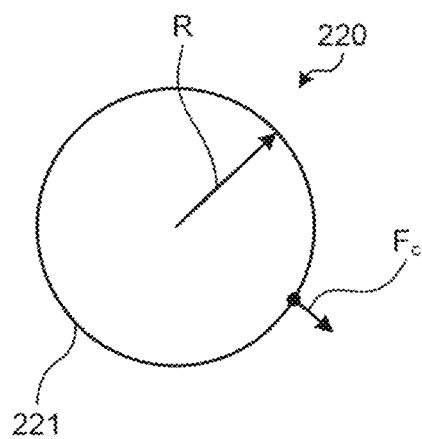
FIG. 4 is a diagram illustrating an example of a path formed by a stator in the linear motor system according to the first embodiment.
Figure 5:
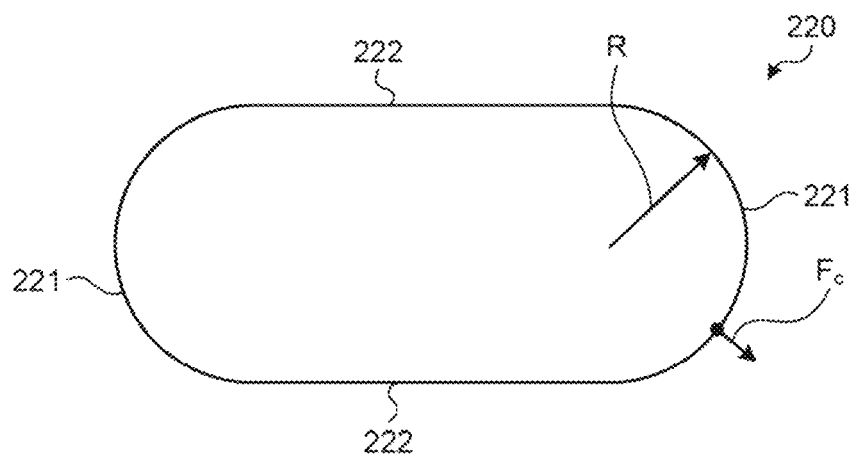
FIG. 5 is a diagram illustrating an example of the path formed by the stator in the linear motor system according to the first embodiment.
Figure 6:
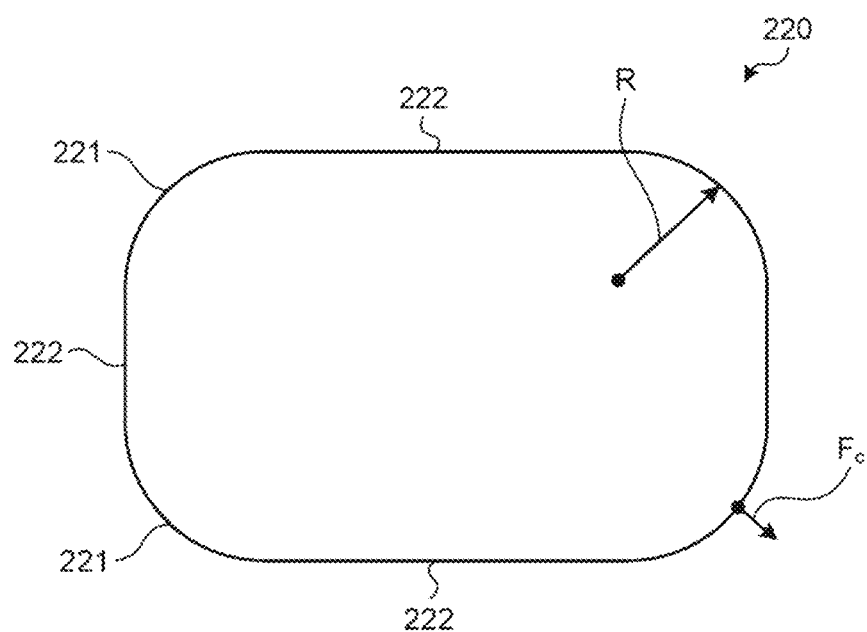
FIG. 6 is a diagram illustrating an example of the path formed by the stator in the linear motor system according to the first embodiment.
Figure 7:
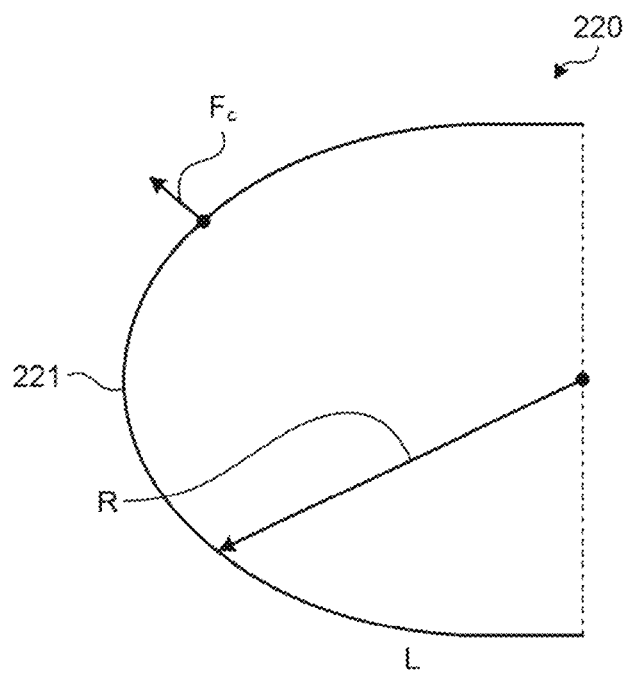
FIG. 7 is a diagram illustrating an example of the path formed by the stator in the linear motor system according to the first embodiment.

FIGS. 4 to 7 are diagrams each illustrating an example of a path formed by the stator in the linear motor system according to the first embodiment. FIG. 4 illustrates a case where a path 220 formed by the stator 200 has a perfect circular shape. FIG. 5 illustrates a case where the path 220 is a rounded rectangle formed of two equal length straight lines arranged parallel to each other and two semicircles arranged at both ends of the two straight lines. FIG. 6 illustrates a case where the path 220 is a rounded rectangle formed by rounding four corners of a rectangle into an arc shape. FIG. 7 illustrates a case where the path 220 is semi-elliptical. When the radius of curvature in the case of FIG. 7 is defined as R, the length of the curve is defined as L, and the clothoid parameter is defined as A, the relationship of the following Formula (1) is established.

$$RL = A^2 \quad (1)$$

As illustrated in FIGS. 4 to 7, the path 220 according to the first embodiment includes one or more curved portions 221. As illustrated in FIGS. 5 and 6, the path 220 may include straight portions 222, but as illustrated in FIGS. 4 and 7, the path 220 need not include the straight portions 222. In addition, the path 220 may have a loop shape as illustrated in FIGS. 4 to 6, or may have a shape other than a loop shape as illustrated in FIG.

When the linear motor system 1 is applied to the path 220 including the curved portion(s) 221 illustrated in FIGS. 4 to 7, the centrifugal force $F_c$ is generated in the mover 50 moving on the curved portion(s) 221. In the first embodiment, the sub-roller 62 provided on the placing table 55 of the mover 50 with the rotation shaft 61 therebetween is engaged with the sub-rail 29 of the stator 200. Thus, a supporting force $F_{rh}$ for supporting the mover 50 receiving the centrifugal force $F_c$ in the opposite direction to the centrifugal force $F_c$ is generated in the sub-roller 62. As described above, the force acting on the mover 50 in the curved portion(s) 221 of the path 220 is expressed by the following Formula (2).

$$F_m + F_{rh} = F_c + F_{z1} + F_{z2} \quad (2)$$

By adding the sub-roller 62, the design margin of the main rollers 57 and 59, the sub-roller 62, and the rotation shafts 56, 58, and 61 related to the conveyance speed and the allowable load in the curved portion(s) 221 is improved.

A conveyance object that is mainly a workpiece, a jig, or the like is placed on the table portion 552 of the mover 50. Thus, the gravity center position of the mover 50 will be considered below. When the conveyance object is placed on the mover 50, the gravity center position G of the mover 50 moves.

At the gravity center position G in the plane perpendicular to the traveling direction, the distance between the gravity center position G and the center of the sub-roller 62 is defined as $L_g$. The distance between the center of the sub-roller 62 and the center of the main roller 59 is defined as $L_s$, and the distance between the position of the magnetic attraction force $F_m$ generated between the armatures 20 and the permanent magnets 52, and the main roller 59 is defined as $L_m$. At this time, when the limit value of the support reaction force at the sub-roller 62 is expressed as $F_{rh\_max}$, the upper limit of the centrifugal force $F_c$, that the sub-roller 62 can support is expressed by the following Formula (3).

$$F_c(L_g + L_s) < F_m L_m + F_{rh\_max} L_s \quad (3)$$

When the orbit radius in the curved portion(s) 221 is defined as R, the speed of the mover 50 is defined as V, and the mass is defined as M, the centrifugal force $F_c$ is expressed by the following Formula (4), and Formula (3) is expressed by the following formula (5).

[Formula 1]
$$F_c = \frac{MV^2}{R} \quad (4)$$

[Formula 2]
$$\frac{MV^2}{R}(L_g L_s) < F_m L_m + F_{rh\_max} L_s \quad (5)$$

At this time, Coriolis force is generated in the mover 50 in addition to the centrifugal force $F_c$, but the Coriolis force is extremely smaller than the magnetic attraction force $F_m$ and the centrifugal force $F_c$. Thus, assuming that the Coriolis force is negligible, then the mover 50 can be prevented from being detached from the stator 200 by the centrifugal force $F_c$ by designing the mover 50 such that Formula (5) is satisfied.

When the distance $L_g$ between the gravity center position G and the center of the sub-roller 62 increases, a force $F_v$ in the Z direction is generated. However, the support reaction force $F_{rv}$ from the rail 26 generated in the main roller 57 prevents the mover 50 from being detached from the stator 200. The force F in FIG. 2 is a resultant force of the centrifugal force $F_c$ and the force $F_v$ in the Z direction.

The sub-roller 62 is mounted on the placing table 55 of the mover 50 with the rotation shaft 61 therebetween, and the placing table 55 is detachably attached to the mover body 51a by a fastening member such as a bolt. The sub-roller 62 acts as a friction element of the mover 50 by being engaged with the sub-rail 29. Thus, for example, in the straight portions 222 in the path 220, the sub-roller 62 need not be engaged with the sub-rail 29. As an example, the stator 200 may be configured not to include the sub-rail 29 in the straight portions 222. As a result, although only in the straight portions 222 in the path 220, it is possible to further reduce the sliding frictional resistance force generated between the mover 50 and the stator 200 during the movement of the mover 50 as compared with the conventional structure.

In the first embodiment, the linear motor system 1 includes the mover 50 including the plurality of permanent magnets 52 linearly arranged in the traveling direction and the stator 200 including the plurality of armatures 20, each of the armatures 20 including the iron core 21 in which the plurality of projections 212, around which the windings 22 are wound, are arranged in the traveling direction. The mover 50 includes the mover body 51a and the placing table 55 fastened to each other by a fastening member. The main roller 57 engaged with the first traveling surface 26a and the main roller 59 engaged with the third traveling surface 27a, which is not parallel to the first traveling surface, are provided on both ends of the mover body 51a in the Z direction. The main rollers 57 and 59 have a function of supporting the magnetic attraction force generated between the mover 50 and the stator 200. The sub-roller 62 engaged with the second traveling surface 29a is provided on the lower surface 552A of the placing table 55 with the rotation shaft 61 therebetween. The sub-roller 62 has a function of supporting a force in a direction opposite to the direction of the magnetic attraction force acting on the mover 50. As a result, the support rigidity in the direction of the magnetic attraction force acting on the mover 50 can be improved. In addition, the mover 50 can move along the base 25 without being detached from the stator 200 even when receiving the centrifugal force in the curved portion(s) 221. Further, the mover 50 includes three rows of rollers, which are less than the conventional mover including four or more rows of rollers. Therefore, it is possible to reduce the sliding frictional resistance force generated between the mover 50 and the stator 200 during the movement of the mover 50. In addition, since the number of rollers is reduced, the mover 50 can be reduced in weight. Therefore, the driving thrust is reduced as compared with the conventional mover.

Further, in the straight portions 222 including no curved portion 221 in the path 220, the sub-roller 62 is not brought into contact with the second traveling surface 29a. Thus, the number of rollers that come into contact with the stator 200 during the movement of the mover 50 is reduced. Therefore, the sliding frictional resistance force generated between the mover 50 and the stator 200 can be further reduced.

Furthermore, the mover 50 includes the mover body 51a and the placing table 55, and has a structure in which the mover body 1a and the placing table 55 are fastened by a fastening member. That is, the placing table 55 is configured to be detachable from the mover body 51a. Thus, an effect is obtained whereby the geometric tolerance management and the assembly of the holding mechanism of the sub-roller 62 with respect to the mover body 51a and the second traveling surface 29a can be facilitated.

In addition, one of the main rollers 57 and 59 in two rows is not a flat roller having a flat rolling surface. Thus, the load of the mover 50 and the conveyance object can be supported. Furthermore, when the gravity center position G of the conveyance object placed on the placing table 55 of the mover 50 becomes high, a force in the vertical direction is generated. However, the main roller that is not a flat roller can receive the force in the vertical direction, and the support reaction force received from the traveling surface on which the main roller travels can prevent the mover 50 from being detached from the stator 200.

Second Embodiment

Figure 8:
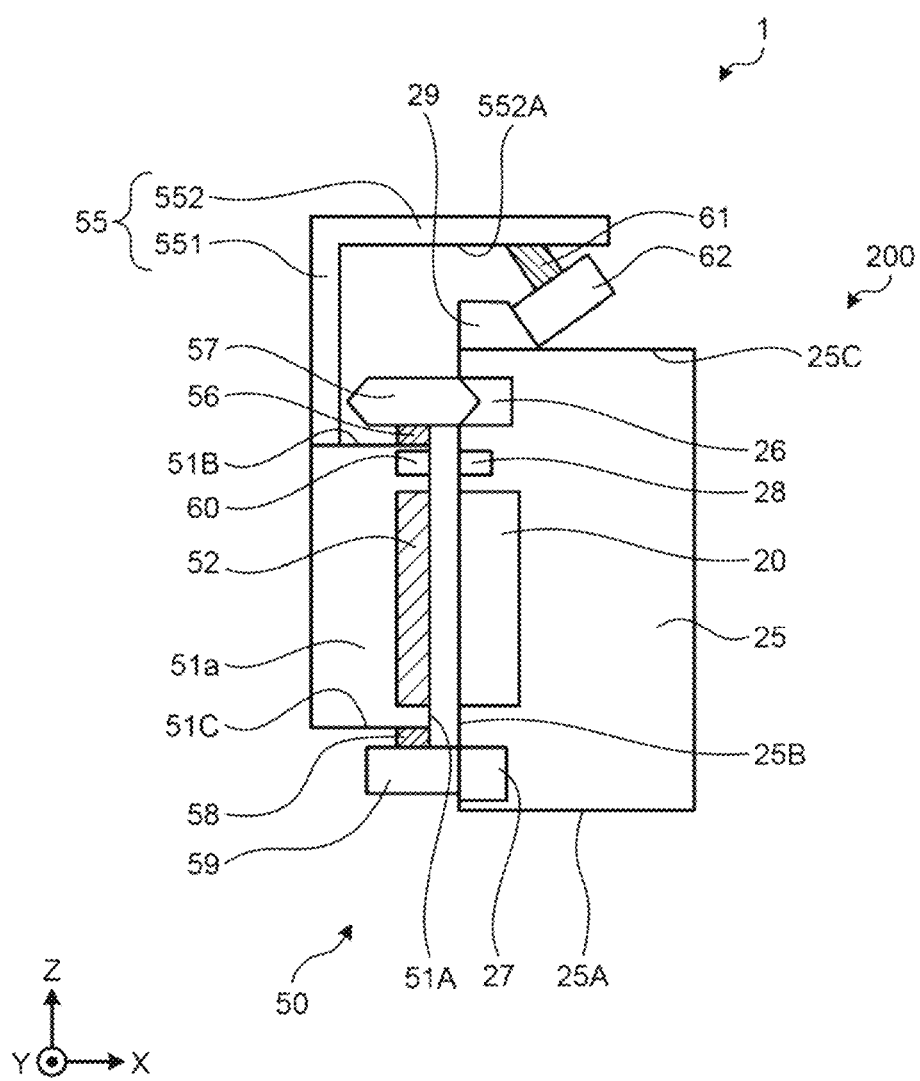
FIG. 8 is a cross-sectional view schematically illustrating an example of a configuration of a linear motor system according to a second embodiment.

FIG. 8 is a cross-sectional view schematically illustrating an example of a configuration of a linear motor system according to a second embodiment. FIG. 8 illustrates a cross section perpendicular to the traveling direction of the mover 50. In the following description, the same components as those in the first embodiment are denoted by the same reference signs, the description thereof is not repeated, and portions different from those in the first embodiment will be described.

In the linear motor system 1 of the second embodiment, how the sub-rail 29 of the stator 200 and the sub-roller 62 of the mover 50 come in contact with each other is different from that in the first embodiment. In the first embodiment, the angle of the traveling surface of the sub-rail 29 is 90 degrees with respect to the upper surface 25C of the base 25. However, in the second embodiment, the angle of the traveling surface of the sub-rail 29 with respect to the upper surface 25C of the base 25 is larger than 0 degrees and smaller than 90 degrees. Accordingly, the attachment angle of the rotation shaft 61 of the sub-roller 62 with respect to the lower surface 552A of the table portion 552 is set such that the rotation shaft 61 is inclined at the same angle as the angle of the traveling surface of the sub-rail 29.

In the second embodiment, the angle of the traveling surface of the sub-rail 29 is larger than 0 degrees and smaller than 90 degrees. Further, the sub-roller 62 is brought into contact with the sub-rail 29. As a result, the sub-roller 62 also supports the load in the Z direction perpendicular to the traveling direction. Therefore, an effect is obtained whereby the support rigidity of the mover 50 in the vertical direction can be improved.

Third Embodiment

Figure 9:
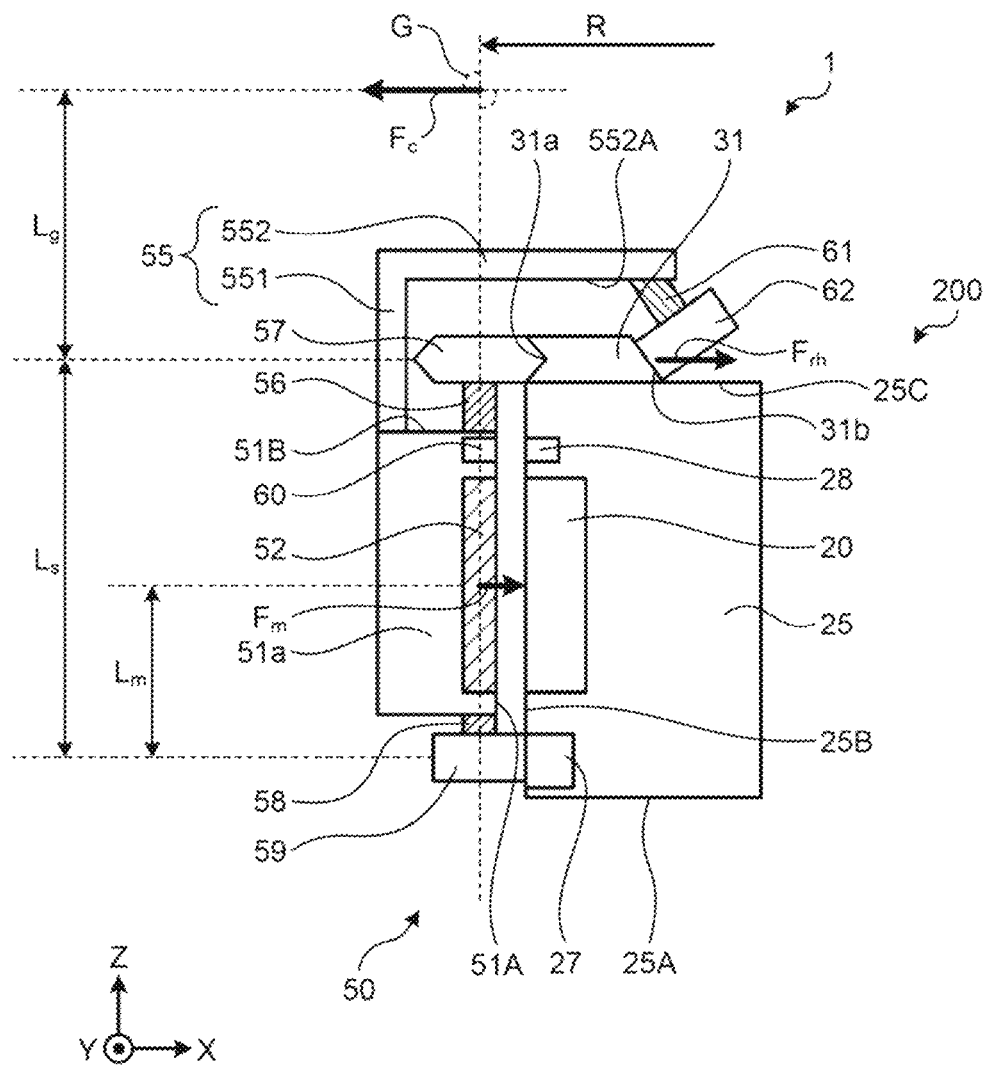
FIG. 9 is a cross-sectional view schematically illustrating an example of a configuration of a linear motor system according to a third embodiment.

FIG. 9 is a cross-sectional view schematically illustrating an example of a configuration of a linear motor system according to a third embodiment. FIG. 9 illustrates a cross section perpendicular to the traveling direction of the mover 50. In the following description, the same components as those in the first and second embodiments are denoted by the same reference signs, the description thereof is not repeated, and portions different from those in the first and second embodiments will be described.

In the linear motor system 1 of the third embodiment, the stator 200 includes a common rail 31 as a common component obtained by integrating the rail 26 and the sub-rail 29. The common rail 31 is provided on the upper surface 25C of the base 25. The common rail 31 includes a rail 31a having the first traveling surface 26a on the side surface facing the mover 50, and a sub-rail 31b having the second traveling surface 29a on the surface opposite to the rail 31a. In one example, the rail 31a is a V-groove rail, and the sub-rail 31b is a flat rail. In the example of FIG. 9, in a similar manner to the case of the second embodiment, the angle of the traveling surface of the sub-rail 31b with respect to the upper surface 25C of the base 25 is larger than 0 degrees and smaller than 90 degrees. The angle of the traveling surface of the sub-rail 31b with respect to the upper surface 25C of the base 25 may be 90 degrees.

In the third embodiment, the common rail 31 including the rail 31a and the sub-rail 31b is provided on the upper surface 25C of the base 25. As a result, the components with which the main roller 57 and the sub-roller 62 are engaged are made common; therefore, an effect is obtained whereby the manufacturing cost of the linear motor system 1 can be reduced. In addition, since the rail 31a and the sub-rail 31b are integrated, the number of components is reduced as compared with the cases of the first and second embodiments. As a result, an effect is obtained whereby the accuracy of the main roller 57 as well as the sub-roller 62 can be easily adjusted and the assembly performance can be improved.

Fourth Embodiment

Figure 10:
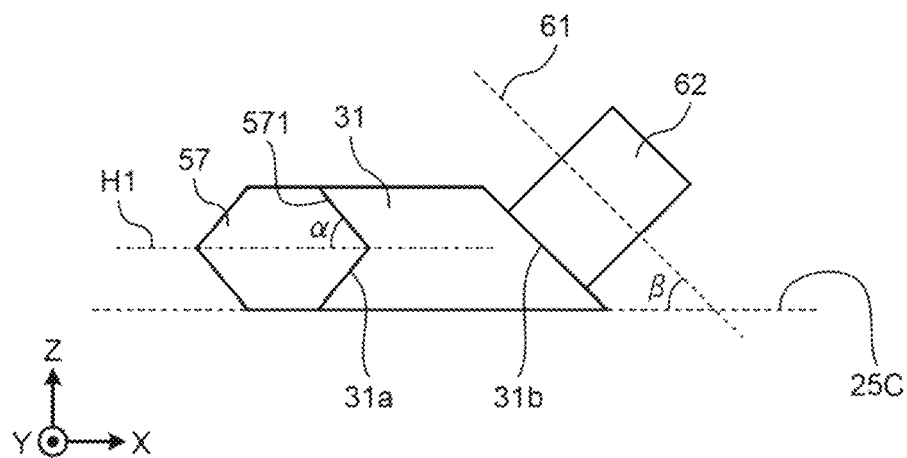
FIG. 10 is a cross-sectional view schematically illustrating a state of contact of a common rail with a main roller and a sub-roller according to a fourth embodiment.

FIG. 10 is a cross-sectional view schematically illustrating a state of contact of the common rail with the main roller and the sub-roller according to a fourth embodiment. FIG. 10 illustrates a cross section perpendicular to the traveling direction of the mover 50. In the cross section perpendicular to the traveling direction of the mover 50, an inclination angle between a plane H1 parallel to the upper surface 25C of the base 25 and a rolling surface 571 of the main roller 57 engaged with the rail 31a is defined as a. An inclination angle between the tipper surface 25C of the base 25 and the rotation shaft 61 of the sub-roller 62 is defined as β. Here, the upper surface 25C of the base 25 is parallel to the horizontal plane.

When the mover 50 is moved at a speed higher than the normal driving speed, there is a possibility that the mover 50 may deviate, or be disengaged, from the common rail 31 depending on the inclination angle β of the sub-roller 62. At this time, it is possible to prevent deviation in the inclination direction by setting α and β to satisfy the relationship of the following Formula (6), where 0<α<90°.

$$\alpha < \beta \quad (6)$$

Figure 11:
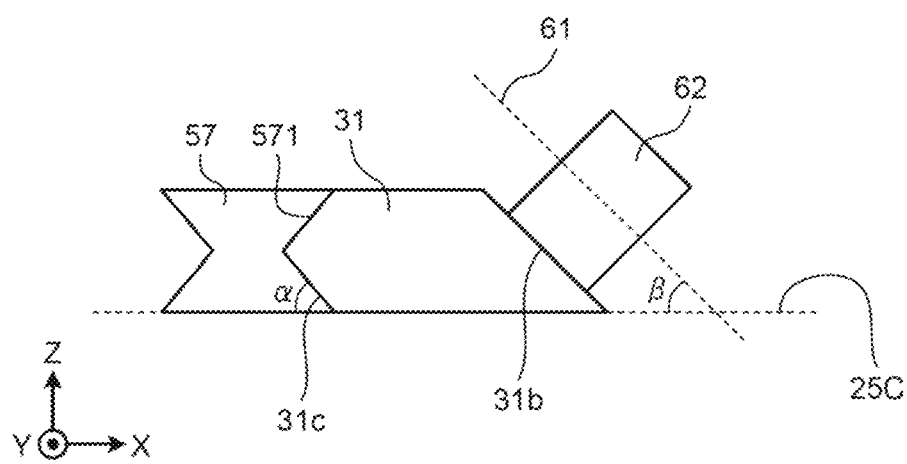
FIG. 11 is a cross-sectional view schematically illustrating another example of a state of contact of the common rail with the main roller and the sub-roller according to the fourth embodiment.

FIG. 11 is a cross-sectional view schematically illustrating another example of a state of contact of the common rail with the main roller and the sub-roller according to the fourth embodiment. FIG. 11 illustrates a cross section perpendicular to the traveling direction of the mover 50. In FIG. 11, the shape of the traveling surface of a rail 31c engaged with the main roller 57 is different from that in the case of FIG. 10. That is, the rail 31c is a triangular rail having a triangular traveling surface in the cross section perpendicular to the traveling direction. In addition, in the cross section perpendicular to the traveling direction of the mover 50, the rolling surface 571 present on the peripheral portion along the circumference of the main roller 57 has a V shape engaged with the triangular rail. In this case also, in the cross section perpendicular to the traveling direction of the mover 50, α and β are set such that the relationship of Formula (6) is satisfied when an inclination angle between the upper surface 25C of the base 25 and the rolling surface 571 of the main roller 57 engaged with the rail 31c is defined as α.

In the fourth embodiment, the inclination angle α between the rolling surface 571 of the main roller 57 engaged with the common rail 31 and the plane H1 parallel to the upper surface 25C of the base 25 is made smaller than the inclination angle β between the upper surface 25C of the base 25 and the rotation shaft 61 of the sub-roller 62. As a result, an effect is obtained whereby the mover 50 can be prevented from deviating in the inclination direction.

Fifth Embodiment

Figure 12:
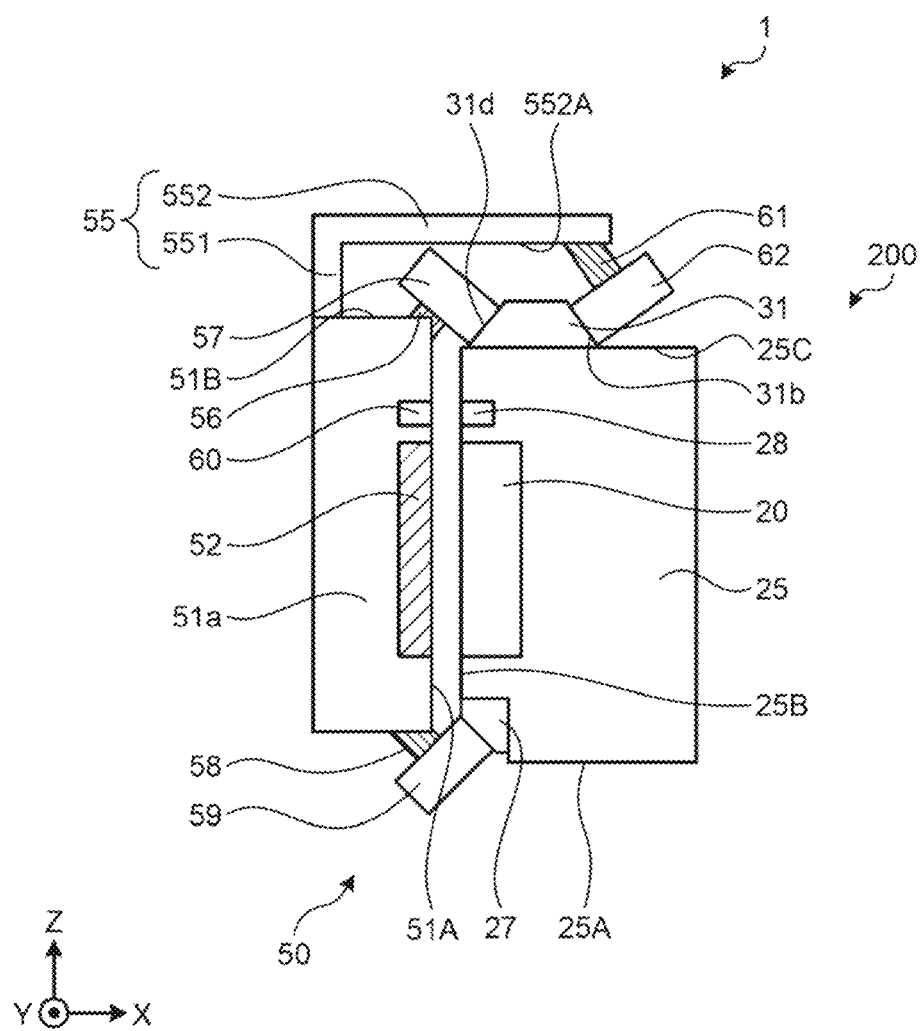
FIG. 12 is a cross-sectional view schematically illustrating an example of a configuration of a linear motor system according to a fifth embodiment.

FIG. 12 is a cross-sectional view schematically illustrating an example of a configuration of a linear motor system according to a fifth embodiment. FIG. 12 illustrates a cross section perpendicular to the traveling direction of the mover 50. In the following description, the same components as those in the first, second, third, and fourth embodiments are denoted by the same reference signs, the description thereof is not repeated, and portions different from those in the first, second, third, and fourth embodiments will be described.

In the fifth embodiment, the main rollers 57 and 59 and the sub-roller 62 are flat rollers having flat rolling surfaces. Thus, a rail 31d engaged with the main roller 57 of the common rail 31 is a flat rail having a flat traveling surface. The traveling surface of the rail 31d is inclined at an angle larger than 0 degrees and smaller than 90 degrees with respect to the upper surface 25C of the base 25. The traveling surface of the rail 27 is inclined at an angle larger than 0 degrees and smaller than 90 degrees with respect to the lower surface 25A of the base 25. To bring the rolling surfaces into contact with the rails 31d and 27, the rotation shafts 56 and 58 of the main rollers 57 and 59 are disposed to be inclined unlike the cases of the first, second, third, and fourth embodiments.

At least one of an inclination angle between the rotation shaft 56 of the main roller 57 and the upper surface 25C of the base 25 and an inclination angle between the rotation shaft 58 of the main roller 59 and the lower surface 25A of the base 25 is defined as a. In addition, an inclination angle between the rotation shaft 61 of the sub-roller 62 and the upper surface 25C of the base 25 is defined as β. In a case where the inclination angle α and the inclination angle β are set to satisfy Formula (6), it is possible to prevent the mover 50 from deviating in the inclination direction as described in fourth embodiment.

In the fifth embodiment, all of the main rollers 57 and 59 and the sub-roller 62 are formed of flat rollers. As a result, the rollers used in the linear motor system 1 can be made common. Therefore, an effect is obtained whereby the manufacturing cost of the linear motor system 1 can be reduced.

The configurations described in the above-described embodiments provide examples of the present invention, and any of the configurations can be combined with another known technique, and a part of each configuration can be eliminated or changed without departing from the gist of the present invention.

REFERENCE SIGNS LIST 1 linear motor system; 10 linear motor; 20 armature; 21 iron core; 22 winding; 25 base; 25A, 51C, 552A lower surface; 25B, 51A side surface; 25C, 51B upper surface; 26, 27, 31a, 31c, 31d rail; 26a first traveling surface; 27a third traveling surface; 28, 60 position detection unit; 29, 31b sub-rail; 29a second traveling surface; 31 common rail; 50 mover; 51 base plate; Sla mover body; 52 permanent magnet; 55 placing table; 56, 58, 61 rotation shaft; 57, 59 main roller; 62 sub-roller; 200 stator; 211 groove; 212 projection; 220 path; 221 curved portion; 222 straight portion; 551 support portion; 552 table portion.

The invention claimed is:

1. A linear motor system comprising:
a mover including a plurality of permanent magnets arranged in a traveling direction in a plane parallel to a plane formed by the traveling direction and a vertical direction; and
a stator including an armature including an iron core in which a plurality of projections around which windings are wound are arranged in the traveling direction, the armature being disposed to face the permanent magnets of the mover, wherein
the mover includes:
a mover body including a first main roller engaged with a first traveling surface disposed on the stator;
a placing table on which a conveyance object is placed; and
a sub-roller engaged with a second traveling surface disposed on an upper surface of the stator, the sub-roller having a rolling surface that is flat,
the first main roller supports a magnetic attraction force generated between the stator and the mover,
the sub-roller supports a force in a direction opposite to the magnetic attraction force acting on the mover,
in a cross section perpendicular to the traveling direction of the mover, an angle between a rolling surface of the first main roller and a horizontal plane is smaller than an angle between the rolling surface of the sub-roller and the horizontal plane, and
a rotation shaft of the first main roller and a rotation shaft of the sub-roller are not parallel to each other.

2. The linear motor system according to claim 1, wherein the mover body further includes a second main roller engaged with a third traveling surface disposed on the stator, and
the first traveling surface and the third traveling surface are not parallel to each other.

3. The linear motor system according to claim 1, wherein an angle between the rotation shaft of the sub-roller and the horizontal plane is larger than 0 degrees and smaller than 90 degrees.

4. The linear motor system according to claim 1, wherein the first traveling surface has a V-groove shape in cross section, and
the first main roller engaged with the first traveling surface has the rolling surface having a triangular shape in cross section passing through the rotation shaft.

5. The linear motor system according claim 1, wherein the first traveling surface has a triangular shape in cross section, and
the first main roller engaged with the first traveling surface has the rolling surface having a V shape in cross section passing through the rotation shaft.

6. The linear motor system according to claim 2, wherein at least one of the first traveling surface and the third traveling surface is flat, and
the first main roller or the second main roller engaged with the first traveling surface or the third traveling surface that is flat is a flat roller.

7. The linear motor system according to claim 2, wherein the first main roller is disposed above the permanent magnets, and
the second main roller is disposed below the permanent magnets, and
the stator further includes a common component including the first traveling surface and the second traveling surface.

8. A linear motor system comprising:
a mover including a plurality of permanent magnets arranged in a traveling direction in a plane parallel to a plane formed by the traveling direction and a vertical direction; and
a stator including an armature including an iron core in which a plurality of projections around which windings are wound are arranged in the traveling direction, the armature being disposed to face the permanent magnets of the mover, wherein
the mover includes:
a mover body including a first main roller engaged with a first traveling surface disposed on the stator and a second main roller engaged with a third traveling surface disposed on the stator;
a placing table on which a conveyance object is placed; and
a sub-roller engaged with a second traveling surface disposed on an upper surface of the stator, the sub-roller having a rolling surface that is flat,
the first main roller and the second main roller support a magnetic attraction force generated between the stator and the mover,
the sub-roller supports a force in a direction opposite to the magnetic attraction force acting on the mover, and
in a cross section perpendicular to the traveling direction of the mover, at least one of an angle between a rotation shaft of the first main roller and the horizontal plane and an angle between a rotation shaft of the second main roller and the horizontal plane is smaller than an angle between a rotation shaft of the sub-roller and the horizontal plane.

* * * * *